United States Patent [19]

Farnam

[11] 4,262,947
[45] Apr. 21, 1981

[54] METHOD OF MAKING VEHICLE BUMPER SHIMS AND ARTICLES PRODUCED THEREBY

[75] Inventor: Robert G. Farnam, Lake Forest, Ill.

[73] Assignee: Colt Industries Operating Corp, New York, N.Y.

[21] Appl. No.: 110,846

[22] Filed: Jan. 10, 1980

[51] Int. Cl.³ ............................................. B60R 19/02
[52] U.S. Cl. ...................................... 293/1; 293/102; 293/155; 308/244; 113/116 V
[58] Field of Search ........................... 293/1, 155, 102; 308/244; 113/116 V

[56] References Cited

U.S. PATENT DOCUMENTS

| | | | |
|---|---|---|---|
| 1,748,412 | 2/1930 | Crawford | 308/244 |
| 1,949,114 | 2/1934 | Darrach | 308/244 |
| 2,707,310 | 5/1955 | Goodrich | 308/244 |
| 2,772,596 | 12/1956 | Trussel | 308/244 |
| 3,773,373 | 11/1973 | McLanchlan | 293/155 |
| 4,160,561 | 7/1979 | Farnam | 293/1 |

*Primary Examiner*—Robert R. Song
*Attorney, Agent, or Firm*—Mason, Kolehmainen, Rathburn & Wyss

[57] ABSTRACT

A method of making vehicle bumper shims preferably using a progressive die wherein the areas which receive the clamping bolts are built up with separate pieces of the same temper steel commonly used to make a shim of one piece flat shim, and which are spot welded to the base piece and produce a shim of the same general type as shown in Farnam et al., U.S. Pat. No. 4,160,561, but which can be tailored to varying thicknesses as required and most importantly, torque retention properties at least as high as a one piece flat shim. The invention includes also the articles produced by the above method.

4 Claims, 4 Drawing Figures

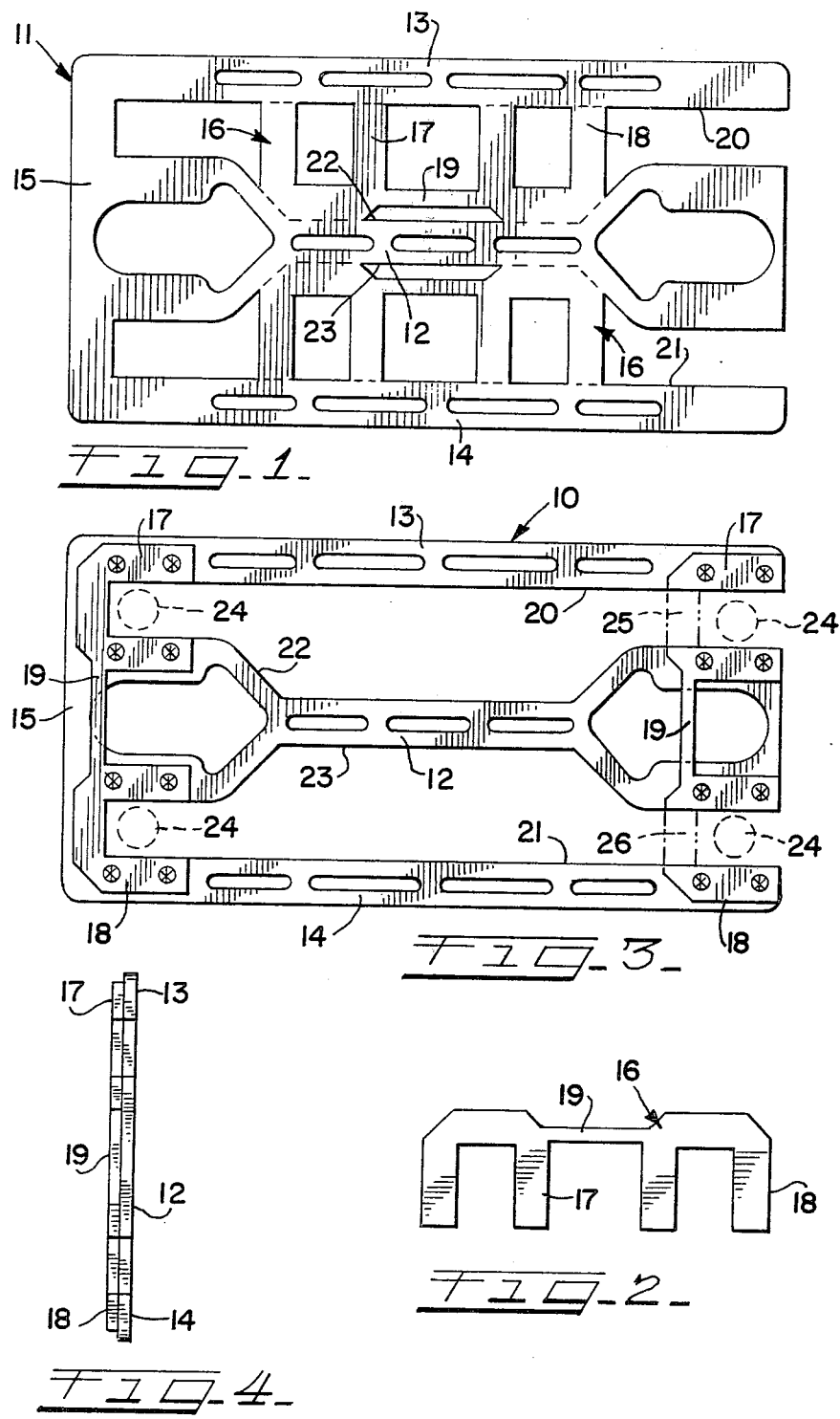

METHOD OF MAKING VEHICLE BUMPER SHIMS AND ARTICLES PRODUCED THEREBY

It was found after considerable testing with the vehicle bumper shim described in U.S. Pat. No. 4,160,561 that when a single shim was used there was adequate torque retention, even with a steel that was of soft temper sufficient to fold without cracking. When one shim was stacked on another, however, to make up for substantial misalignment, there was excessive torque loss due to the fact that its misalignment between the clamping bolts and the slots in the shim in some cases would double up to the point where the head of the clamping bolts was only clamping a small fraction of a square inch of metal. This condition; namely, soft temper steel combined with minimum area under clamp load could with the very high clamp loads used create a torque retention problem.

The present invention seeks to remedy this problem by using a harder material with higher temper for the shim, and thereby building up the load carrying area adjacent the clamping bolts by using separate pieces of the harder and higher temper material spot-welded to the base shim, thus eliminating any fold of material which certainly tends to reduce torque retention.

All of this will be better understood by referring to the drawings in which

FIG. 1 shows a sheet metal blank which has gone through a first blanking operation of a progressive die to cut out certain areas from a metal strip being fed through the press;

FIG. 2 shows an elevational view of the two reinforcing parts which are die cut from the partially developed blank of FIG. 1;

FIG. 3 shows the reinforcing parts superimposed upon the basic shim part and spot-welded thereto with dotted lines indicating portions of one of the reinforcing blanks which are die cut away in a separate blanking operation; and FIG. 4 shows an end elevational view of the finished shim as viewed from the right side of FIG. 3.

The shim which in its completed form is generally indicated in FIG. 3 by the numeral 10 is formed by taking a continuous strip of cold rolled steel or C-1010 steel or equivalent, preferably 1/16" thick, and passing it through a press with a progressive die, which first of all makes the cut-outs as shown in FIG. 1, thereby defining the basic shim structure 11 comprising a central tine 12 and two outer tines 13 and 14, all of which are connected by an end portion 15.

On either side of the central tine 12 two similar reinforcing pieces generally designated 16 are formed, each of which comprises a duo-bifurcated piece, or four-legged piece, having legs 17 and 18 interconnected by a strap 19 so that in the next step of the progressive die, by cutting along the inner edge 20 and 21 of the outer tines 13 and 14 respectively, and by die cutting along the outer edges 22 and 23 of the central tine 12, there are formed the two separate duo-bifurcated pieces 16 which may advantageously be used for reinforcing and building up the load carrying areas adjacent to the clamping bolts shown in dotted lines at 24.

It will be noted that for this to be possible, the width of the central tine 12 in the area between the legs 17 and between the legs 18 of the part 16 is more than twice the width of the legs 17 and 18 so that when the part 16 is severed from the base section 11 it may have the shape and stability of the part shown in FIG. 2.

After the pieces 16 are separated from the shim base 11 these parts are automatically fed to a collating machine which places and holds the reinforcing members 16 in place over the base structure 11 and they are then spot-welded in place as shown in FIG. 3. With the parts still held in a suitable fixture, they are then indexed under a shear die to cut out the parts shown in dotted lines at 25 and 26 in FIG. 3, the shearing taking place along the lines defining the inner margins 20 and 21 of the outer tines 13 and 14 and along the outer edges 22 and 23 of the central tine 12.

The shim formed by the method described above has certain advantages over the one described in my earlier U.S. Pat. No. 4,160,561. In the first place, it can be made of harder material with higher temper because one does not have to be concerned about the cracking of the material by folding it to form an ear adjacent to the clamping bolt. By using the harder material there is greater resistance to wear and tear, and by building up the clamping areas as required by the use of one or more reinforcing members 16, the bumper shim may be given any desired thickness and yet be completely solid in the clamping area to provide proper torque retention characteristics. It should be mentioned that if more than one thickness of reinforcement is required, additional reinforcement members 16 may be die-cut from metal of suitable thickness, say, 1/16" or ⅛", and these additional reinforcing members would be fed to a second collating device with another spot-welding device to make the attachment.

The various cut-outs shown in the base structure 11 are to save weight since these shims are used in automobile bumpers and every ounce of weight that can be saved is of great importance.

Various modifications will be apparent to those skilled in the art, and these are embraced within the accompanying claims.

I claim:

1. The method of making a light-weight bumper shim of the type having three parallel tines (two outer and a central tine) which consists in
    (a) taking a rectangular blank;
    (b) die-cutting from the blank a number of pieces to produce a part leaving two outer tines and a central tine with the latter integrally attached to each outer tine by four spaced legs;
    (c) die-cutting from the part of (b) above two duo-bifurcated pieces interconnected by a connecting strap;
    (d) locating the duo-bifurcated pieces over the upper and lower ends of the tines and securing them thereto to provide upper and lower reinforced load carrying areas flanking bolt receiving areas between the tines of the shim;
    (e) and then cutting away from the lower duo-bifurcated piece the portions between the central tine and the outer tines.

2. The method as set forth in claim 1 in which the central tine of the part produced in step (b) in the area of said spaced legs has a width greater than twice the width of said legs.

3. The method as set forth in claim 1 in which the shim is made of high carbon steel and the duo-bifurcated pieces in step (d) are secured to the tines by spot welding.

4. As an article of manufacture, a metal shim comprising a body portion having a central tine flanked by outer tines;

The latter tines being of general rectangular form and the central tine having a relatively narrow intermediate portion connecting upper and lower wider portions;

said shim having bolt receiving areas between the central tine and the outer tines with load carrying areas at the top and bottom of the shim between the central tine and the outer tines;

and separate top and bottom metal reinforcements secured to the shim at said load carrying areas.

* * * * *